United States Patent
Huang

(10) Patent No.: US 12,444,151 B2
(45) Date of Patent: Oct. 14, 2025

(54) METHOD AND SYSTEM OF IMAGE PROCESSING WITH INCREASED SUBJECTIVE QUALITY 3D RECONSTRUCTION

(71) Applicant: Intel Corporation, Santa Clara, CA (US)

(72) Inventor: Zhengxu Huang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 18/030,025

(22) PCT Filed: Dec. 10, 2020

(86) PCT No.: PCT/CN2020/135201
§ 371 (c)(1),
(2) Date: Apr. 3, 2023

(87) PCT Pub. No.: WO2022/120698
PCT Pub. Date: Jun. 16, 2022

(65) Prior Publication Data
US 2023/0419629 A1     Dec. 28, 2023

(51) Int. Cl.
*G06T 19/20* (2011.01)
*G06T 15/00* (2011.01)
(Continued)

(52) U.S. Cl.
CPC .............. *G06T 19/20* (2013.01); *G06T 15/00* (2013.01); *G06T 17/00* (2013.01); *H04N 19/513* (2014.11);
(Continued)

(58) Field of Classification Search
None
See application file for complete search history.

(56) References Cited

U.S. PATENT DOCUMENTS

| 2013/0162785 A1 | 6/2013 | Michot et al. |
| 2019/0130589 A1* | 5/2019 | Fu ...................... G01B 11/2513 |
| 2020/0118342 A1* | 4/2020 | Varshney ................ G06T 13/20 |

FOREIGN PATENT DOCUMENTS

| CN | 101610411 | 12/2009 |
| CN | 103744086 | 4/2014 |
| CN | 109579840 | 4/2019 |

OTHER PUBLICATIONS

International Search Report and Written Opinion for PCT Application No. PCT/CN2020/135201, dated Sep. 8, 2021.
(Continued)

*Primary Examiner* — Kee M Tung
*Assistant Examiner* — Biao Chen
(74) *Attorney, Agent, or Firm* — Hanley, Flight & Zimmerman, LLC

(57) ABSTRACT

Example systems, articles and methods to improve subjective quality of 3D reconstruction are disclosed. An example method disclosed herein includes obtaining image data of decoded video frame sequences of a same scene from multiple perspectives. The example method also includes generating a three dimensional (3D) structure of 3D points based on the image data. The example method further includes refining locations of the 3D points in the 3D structure based on a decoder-based bundle adjustment, the decoder-based bundle adjustment to refine the locations based on decoder prediction data.

20 Claims, 11 Drawing Sheets

(51) Int. Cl.
*G06T 17/00* (2006.01)
*H04N 19/513* (2014.01)
*H04N 19/597* (2014.01)

(52) U.S. Cl.
CPC .... *G06T 2219/2004* (2013.01); *H04N 19/597* (2014.11)

(56) References Cited

OTHER PUBLICATIONS

"SFM", https://openmvg.readthedocs.io/en/latest/openMVG/sfm/sfm/, 2023, 5 pages.
Kummerle, R., et al., "g2o: A General Framework for Graph Optimization", 2011 IEEE International Conference on Robotics and Automation, Shanghai International Conference Center, May 9-13, 2011, Shanghai, China, 7 pages.
Wikipedia, "Bundle Adjustment", https://en.wikipedia.org/wiki/Bundle_adjustment, 2023, 3 pages.
International Preliminary Report on Patentability from PCT/CN2021/135201 notified Jun. 22, 2023, 5 pgs.

* cited by examiner

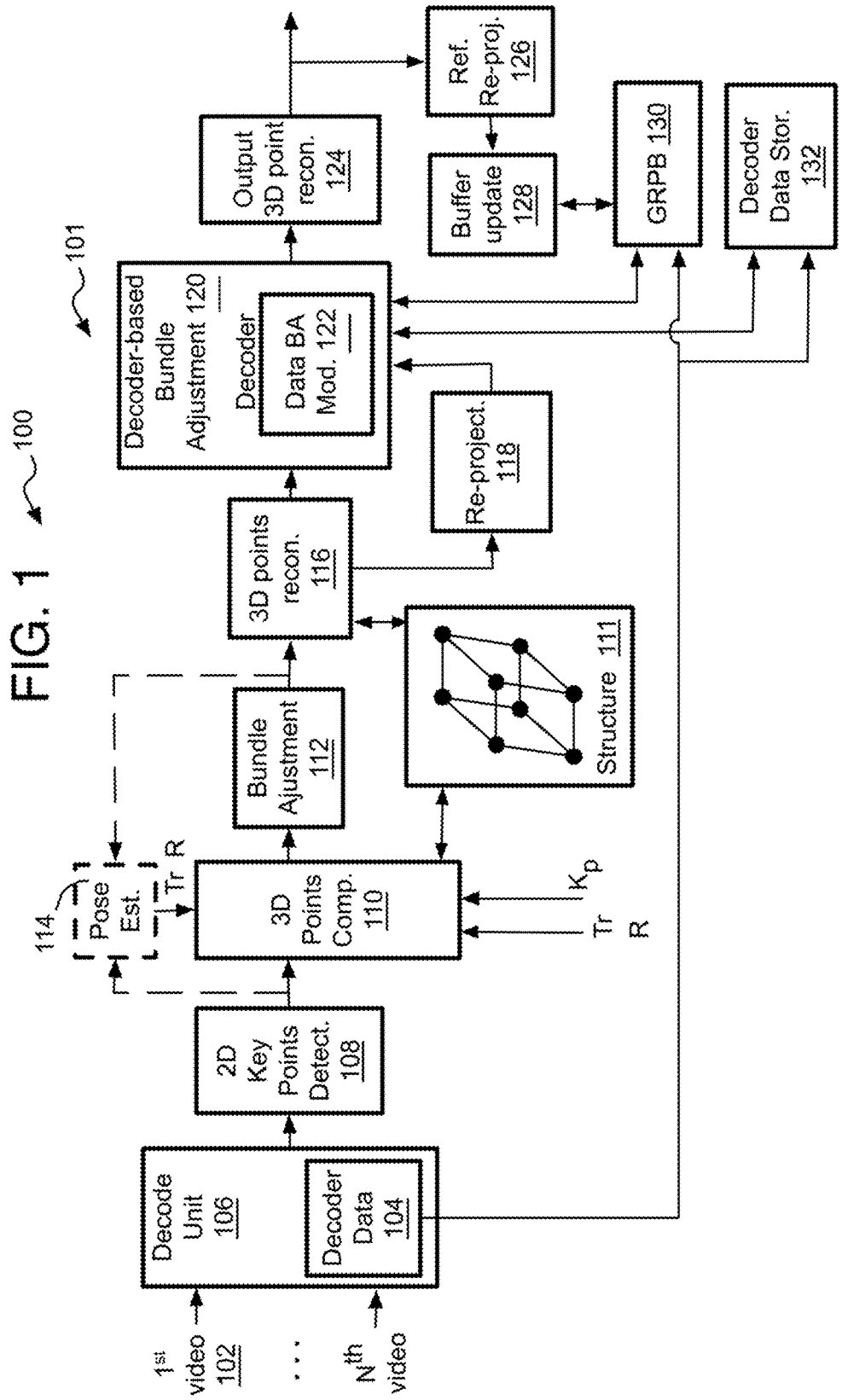

FIG. 1A

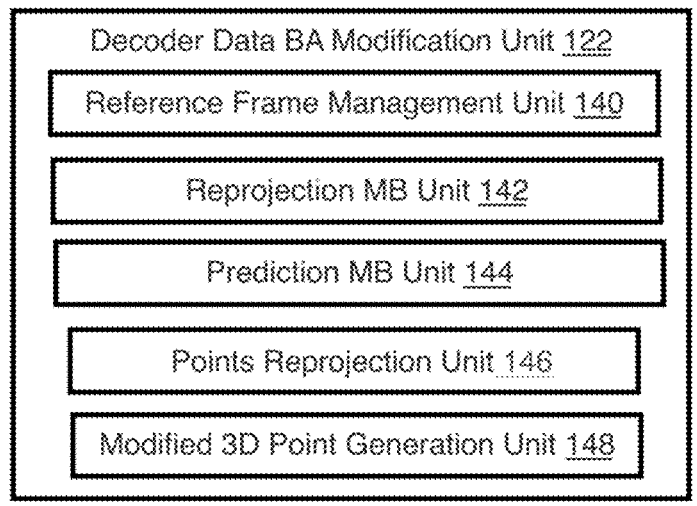

↙ 101

Decoder Data BA Modification Unit 122
- Reference Frame Management Unit 140
- Reprojection MB Unit 142
- Prediction MB Unit 144
- Points Reprojection Unit 146
- Modified 3D Point Generation Unit 148

OBTAIN IMAGE DATA OF DECODED VIDEO FRAME SEQUENCES OF THE SAME SCENE FROM MULTIPLE PERSPECTIVES 202

↓

GENERATE A 3D STRUCTURE OF 3D POINTS USING THE IMAGE DATA 204

↓

REFINE THE LOCATIONS OF THE 3D POINTS IN A 3D STRUCTURE COMPRISING USING DECODER PREDICTION DATA TO MODIFY THE LOCATION OF THE 3D POINTS IN A DECODER-BASED BUNDLE ADJUSTMENT 206

FIG. 7
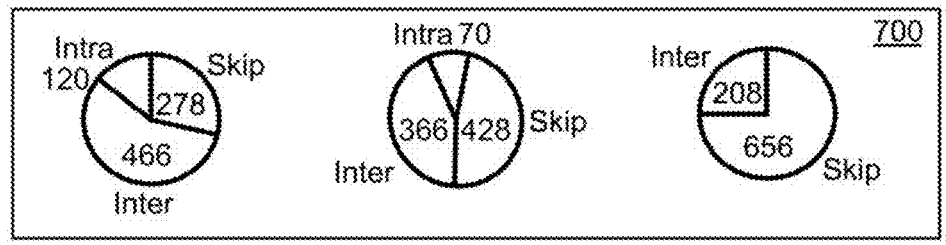
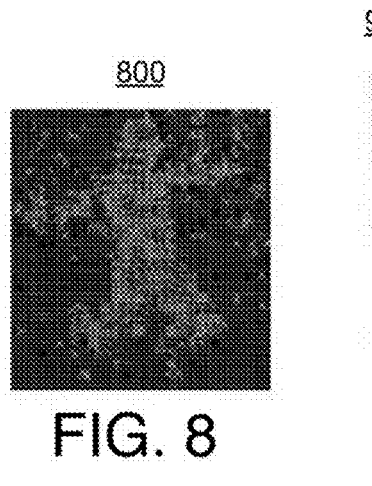
FIG. 8
FIG. 9A
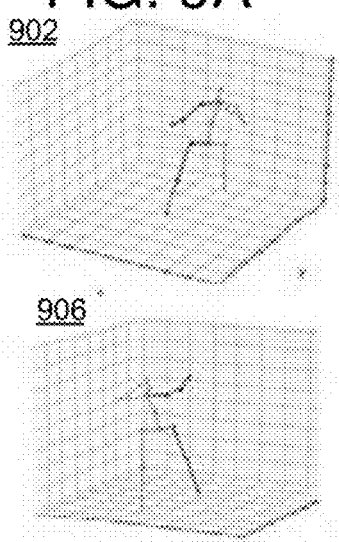
FIG. 9B
FIG. 9C
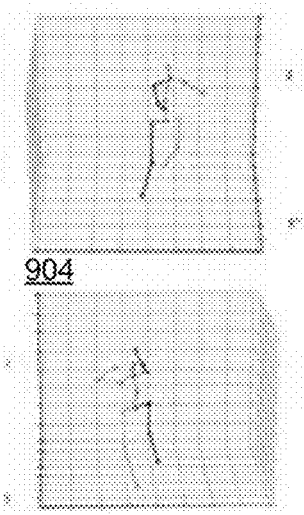
FIG. 9D
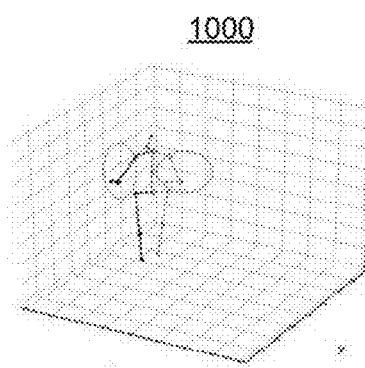
FIG. 10A
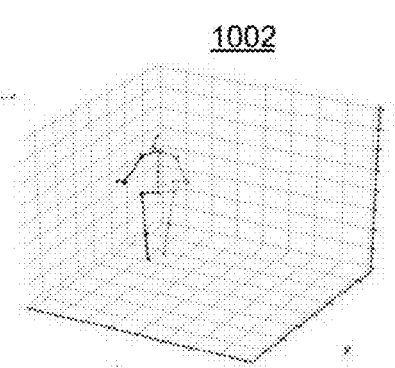
FIG. 10B

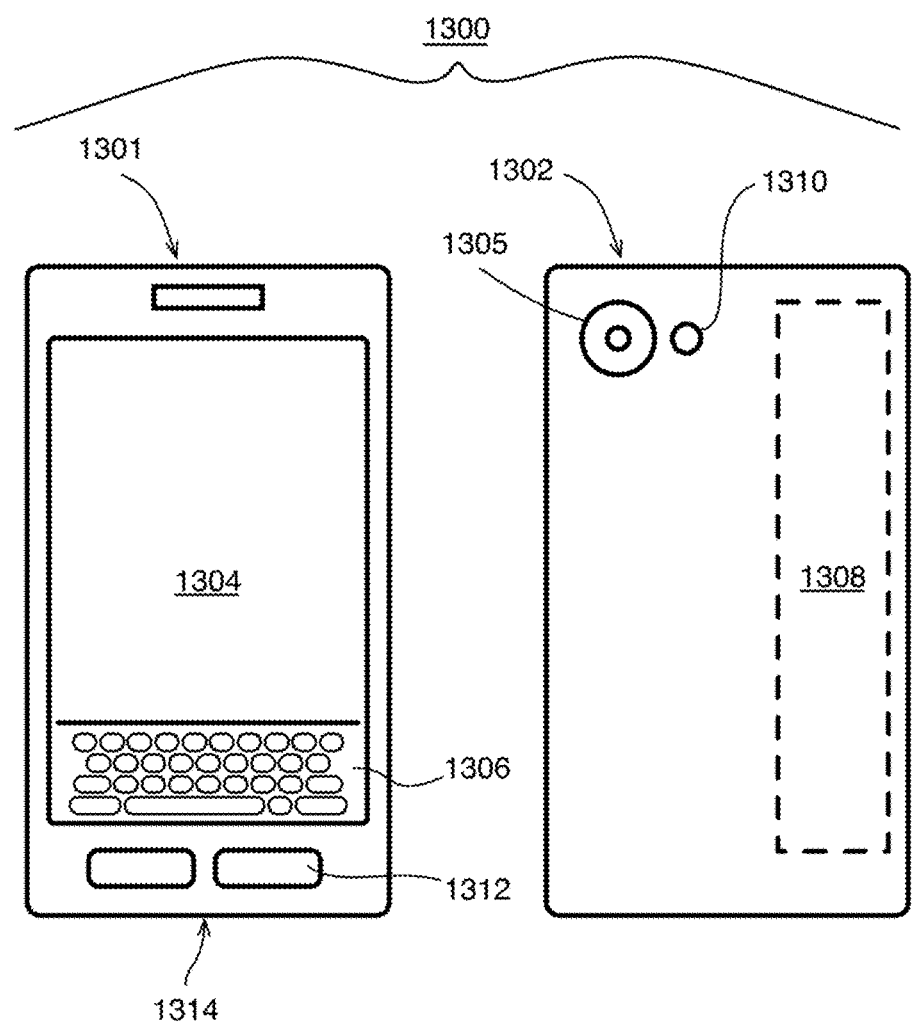

METHOD AND SYSTEM OF IMAGE PROCESSING WITH INCREASED SUBJECTIVE QUALITY 3D RECONSTRUCTION

CLAIM OF PRIORITY

This Application is a National Stage Entry of, and claims priority to, PCT Application No. PCT/CN2020/135201, filed on 10 Dec. 2020 and titled "METHOD AND SYSTEM OF IMAGE PROCESSING WITH INCREASED SUBJECTIVE QUALITY 3D RECONSTRUCTION", which is incorporated by reference in its entirety for all purposes.

BACKGROUND

Camera arrays may be used to capture an event, people, or other objects from different perspectives for surveillance, biomechanical analysis (e.g., gait analysis), tracking multiple subjects such as athletes at athletic events or for athlete training, and/or computer-based applications, such as robotics, computer vision, and/or creation of intelligent interactive environments such as with gaming, virtual reality (VR), or augmented reality (AR). This often may involve 3D reconstruction of 3D structures or spaces from points projected from the multiple images captured from the cameras. The 3D points then can be re-projected from the model in various directions to form a new video or fill in missing parts of the existing video. Video reconstructed based on the 3D points, however, often still has relatively lower subjective quality when the scene has significant shaking and/or jumping that is visible over a continuous run of a video sequence over a certain time or number of frames, and formed from re-projecting the 3D points. This especially occurs when the scene has moving objects. This significant jitter is visible to viewers of the video, giving the viewer a poor experience.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a schematic diagram of an image processing system that performs a method of image processing with increased subjective quality 3D reconstruction in accordance with at least one of the implementations disclosed herein;

FIG. 1A is a schematic diagram of a decoder data modification unit of the system of FIG. 1.

FIG. 2 is a flow chart of a method of image processing with increased subjective quality 3D reconstruction in accordance with at least one of the implementations disclosed herein;

FIG. 7 is a set of graphs showing combinations of coding prediction types in image data that was used to test the method of imaging processing in accordance with at least one of the implementations herein;

FIG. 8 is an image of macroblocks that were used to test the method of imaging processing in accordance with at least one of the implementations herein;

FIGS. 9A-9D are each resulting subjective quality 3D reconstructions of body poses of content of the image of FIG. 8.

FIGS. 10A-10B are each resulting subjective quality 3D reconstructions of a person moving their hands;

FIG. 13 illustrates another example device, all arranged in accordance with at least some implementations of the present disclosure.

DETAILED DESCRIPTION

Figure 3A:
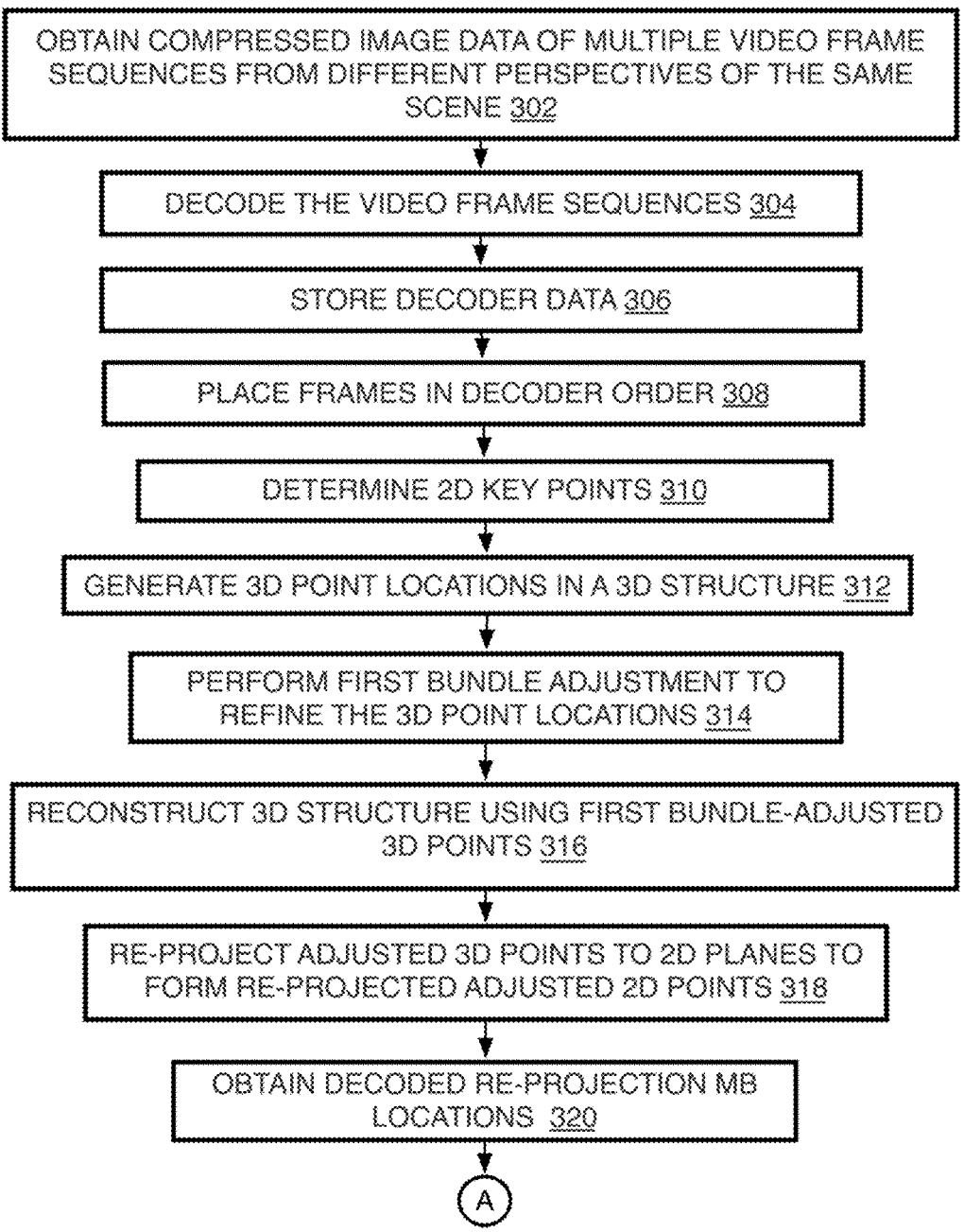
FIGS. 3A-3C is a detailed flow chart of a method of image processing with increased subjective quality 3D reconstruction in accordance with at least one of the implementations disclosed herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or commercial devices such as digital camera arrays, television camera arrays, networked cameras, robots, computer vision systems, processing devices networked to the cameras, or separate from the cameras, such as computers, servers, and so forth, and/or consumer electronic (CE) devices such as imaging devices, digital cameras, smart phones, webcams, video game panels or consoles, set top boxes, tablets with single or multiple cameras, wearables such as HMDs, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of image processing with increased subjective quality 3D reconstruction is described herein.

Many multi-view applications use feature-based 3D reconstruction algorithms that reconstruct a 3D model or space (or graph) from multiple 2D images of a scene from multiple perspectives, and usually captured by a camera array. One such algorithm is structure from motion (SFM) that uses the motion from frame to frame to determine 3D point locations of objects in the scene. After determining 3D points, such algorithms use a bundle adjustment operation to re-project the 3D points back to the 2D images (or camera views) to create a 2D re-projection object (or 2D re-projected points). The difference between the 2D re-projected points and original 2D points are then minimized to refine the 3D point locations. Thereafter, any desired viewpoint or perspective of the 3D objects in the refined 3D structure can be projected onto a video for display to a user or viewer by a subsequent application.

Errors can occur, however, due to the key point location inaccuracies, camera calibration errors due to individual camera position and orientation relative to other cameras, projection errors to form the 3D points in the first place, and re-projection errors during the bundle adjustment operation. Even when the cameras are static, reconstructed 3D video can still have objects that appear to be slightly jittery (with jumps and shaking) from sequence to sequence over a continuous video especially when the scene has moving objects. Specifically, for each individual frame, video based on 3D reconstruction still appears to have good quality. But when a viewer watches these continuously reconstructed images, the subjective quality of the video is often inadequate because the human eye has sufficient sensitivity to see the jitter or jumps in object motion. This occurs because it is difficult for a 3D reconstruction system to match the motion between re-projected images and the motion between originally decoded images since the cost (or loss) function of the bundle adjustment merely minimizes the sum of residuals between the 3D projection points and the original points location on a single frame, thereby preserving errors in the 3D projection point location. As a result, the errors that are introduced by re-projection, and any pose estimation deviation if present, will lead to an erroneous change in motion between reconstructed images, and therefore jitter can be noticeable.

Some conventional machine learning or deep neural network solutions apply the bundle adjustment to multiple frames together to provide better fitting 3D points to further eliminate the errors. This has proven ultimately inadequate, however, because bundle adjustment is still mainly dependent on a least mean square error of the residual between points or small groups of points. Thus, while bundle adjustment may provide good 3D point coordinate optimization, an accurate rotation-translation matrix, accurate intrinsic camera parameters, and minimization of the reprojection error that provides good quality on a single frame or a very small set of frames, the bundle adjustment still is inadequate to provide continuous smooth motion of an object over a large number of frames to better simulate real-world or actual movement of objects.

Other solutions specifically referred to as "motion smoothing" refers to adding intermediate synthetic frames to the video sequence. This often can result in artifacts when the motion being recorded is too fast or result in significant processing delays for certain applications such as display for video games, which is not practical in either case.

To resolve these issues, the disclosed method performs feature-based 3D reconstruction by using decoder data from decoded 2D videos to refine 3D point coordinates of the 3D structure built by using the image data of the videos. By one example form, the decoder data is used during a bundle adjustment to refine the 3D point coordinates. A bundle adjustment minimizes the difference between original 2D image points on an image and 2D points generated by reprojecting reconstructed 3D points back to the 2D image.

In more detail, many 3D reconstruction applications, especially on small or mobile devices with wireless transmission capabilities, use a remote visual cloud to take advantage of shared hardware computing resources when it is impossible, or less efficient, to use local graphics processors. For camera arrays that capture a scene from multiple perspectives, the images captured by the cameras may be compressed by a video encoder using any one of a number of video coding standards such as H264, HEVC, AV1, AVC, VP9, and so forth. The image data then may be streamed to a visual cloud to perform the 3D reconstruction. During the encoding, the forming of coding unit (CU) partitions or coding unit locations on an image, such as by defining the location of macroblocks (MBs) of pixel data, as well as motion estimation and motion compensation operations, provide relatively precise motion of content in the images compared to typical 3D reconstruction algorithms. This may include such great detail that the motion estimation can indicate motion in $½$, $¼$, or even $⅛$ pixel distances to provide excellent accuracy. These coding operations, however, are very computationally intensive steps that generate a large amount of detailed motion data, the manipulation of which also can consume a large computational load. Thus, it is too inefficient and impractical for 3D reconstruction operations to perform these tasks.

The useful prediction data including data related to the motion just mentioned, however, is sent to a decoder with the compressed image data in order to decode the video. When the decoder is decoding videos to be used for 3D reconstruction such as at a visual cloud or other remote 3D reconstruction location or device, then the decoder data (or prediction data or motion-related prediction data) can be used for the 3D reconstruction. Specifically, the method and system herein disclose that the decoder data can be used to improve the subjective quality of the 3D reconstruction, and by one form, while performing the bundle adjustment, and while still providing a sufficiently efficient 3D reconstruction.

The motion-related prediction decoder data may include motion vectors, partitions of coding units (CUs) such as macroblocks (MBs), and reference frame information. A groups of reconstructed pictures buffer (GRPB) may be used to store the final 3D reconstructed video in the form of 2D re-projected images ready for use as reference frames to perform reconstruction for subsequent current images in the videos. Since the position of content in continuously re-projected images is more accurate in the original decoded images versus reconstructed images, perceptible jitter can be significantly reduced for a viewer, especially on moving objects in the video.

Referring to FIG. 1, an image processing device or system 100 may be or have a 3D reconstruction unit 101 that receives compressed image data in the form of multiple video sequences of frames 102 at a decode unit 106. The images may be received directly from cameras that encode the data or from a memory that holds compressed image data. The decode unit 106 may have a demux to separate multiple videos (or audio and video) transmitted together in the same bitstream. The decode unit 106 also may have one or more decoders with one parallel decoder to decode each expected video channel, or fewer decoders than videos where the videos are decoded serially. Decoder data used to decode the video sequences and extracted from the bitstream may be stored in a storage or memory 132. The decoder data may include reference frame lists that indicate which frames are reference frame for another frame, prediction data including block and coding unit locations (including macroblocks), and inter-prediction data including motion vectors with block anchors (or start positions) of the motion vectors.

A 2D key points detector 108 analyzes the initial 2D images of the decoded videos for key points, and a 3D points computation unit 110 then generates 3D point locations based on the key points and generated in a 3D space (also referred to herein as a graph, model, or structure) 111. A first bundle adjustment unit 112 then applies a first bundle adjustment to the 3D points by minimizing residuals between re-projections of the 3D points onto the initial 2D images (or 2D camera views or planes) and initial 2D points on the initial 2D images (or views or planes). A pose estimation unit 114 may generate camera or view poses when not already provided by camera calibration data or when the pose of the cameras change. The updated pose data then may be used on the next 3D point computation and bundle adjustment algorithms.

Thereafter, a 3D points reconstruction unit 116 reconstructs, or updates, the 3D point structure 111 based on the first bundle adjustment. A re-projection unit 118 re-projects the structure to 2D planes (or views) to be used to form re-projection MBs (or other block sizes). N views of a single frame time (or time stamp) T are formed as a group of pictures of time T. Herein then, a frame T refers to a group of pictures or views at time T. The group of views N are then each treated as a current frame to be compared to one or more reference frames by a second or decoder data-based (or just decoder-based) bundle adjustment unit 120.

The decoder-based bundle adjustment unit 120 may further refine the 3D point locations to increase subjective quality of the video as mentioned herein, and by factoring the decoder data. Specifically, the decoder-based bundle adjustment unit 120 may have a decoder data BA modification unit 122 that generates or collects the inputs for an error or cost function. The decoder data BA modification unit 122 then uses the cost function to generate bundle modified 3D points. By one example form, the error function is a non-linear error function that minimizes the difference or residual between the reprojection of the 3D points into reprojection MBs and points in prediction MBs on reference frames both generated by using some form of the decoder prediction data as explained below. The output is modified 3D points with adjusted 3D coordinates with higher subjective quality.

Referring to FIG. 1A for more detail, the decoder data BA modification unit 122 may have a bundle adjustment-groups of reconstructed pictures buffer (BA-GRPB) reference frame management unit 140, a reprojection MB unit 142, a prediction MB unit 144, a points reprojection unit 146, and a modified 3D point generation unit 148. Also relevant here, a reference re-projection unit 126 re-projects final adjusted 3D points to form 2D reference frames while a buffer update unit 128 adds the reference frames to a groups of re-projected pictures buffer 130 (GRPB) described in detail below. The BA-GRPB reference frame management unit 140 determines which frames of the GRPB 130 to use as reference frames for a current frame and obtains the reference data. The reprojection macroblock (MB) unit 142 determines the re-projection MB locations of the 2D points from the reprojection of the 3D points, and by one form, inter MB locations from the decoder data. The reprojection MB unit 142 then groups the reprojections of the 3D points into the re-projection MBs (or $MB_{ij}$ below where i is a count of re-projection frames or 2D images at a time of frame T, and j is a count of macroblocks on a frame). It will be understood that block sizes other than macroblocks could be used instead.

The prediction MB unit 144 determines prediction MBs on previous GRPB reference frames by adding the motion vectors in the decoder data to re-projection MB positions overlaid on the GRPB reference frame of the same time (or order number) as a current frame (this is explained with FIG. 4 below). The points reprojection unit 146 then converts the 3D points to be used in a 2D residual subtraction (by using the camera parameter or projection matrix $P_k$ for example) in the cost function. The modified 3D point generation unit 148 then performs the cost function, such as a general graph optimization (G2O) or other non-linear error or cost function algorithm, that sums the difference between the points in the prediction MBs and 3D points related to reprojection MBs to determine the minimum residual, and solves for the modified 3D points. Thereafter, an output 3D point reconstruction unit 124 performs another update, or replacement, of the 3D structure 111 by adding the modified 3D points to the structure (or replacing the structure). As mentioned, the reference re-projection unit 126 can then generate reference frames for the GRPB 130. More detail is provided with processes 200 and 300 below.

Referring to FIG. 2, a process 200 is a method of image processing with increased subjective quality 3D reconstruction. In the illustrated implementation, process 200 may include one or more operations, functions or actions 202 to 206 generally numbered evenly. By way of non-limiting example, process 200 may be described herein with reference to example image processing system 100 or 1100 of FIG. 1-1A or 11, respectively, and where relevant.

Process 200 may include "obtain image data of decoded video frame sequences of the same scene from multiple perspectives" 202. Thus, a camera array may be placed around an event such as an athletic event at a stadium. The cameras may be networked, or images otherwise collected, so a set of images can be analyzed that are taken at the same or substantially same time, and of the same scene. The image data may be in a YUV, RGB, or other color scheme.

This also may include extracting decoder data from the bitstream and storing the decoder data. The decoder data may include at least one of macroblock location, motion vectors, identification of one or more reference frames, and identification as to whether or not the image data forms or is part of an inter-prediction frame (or slice or other partition).

Process 200 may include "generate a 3D structure of 3D points using the image data" 204. Initially, this may involve 2D key point detection such as determining points important for 3D reconstruction, such as corners and so forth, and this may be repeated for each image or view captured at the same time for a frame T for example. 3D point computation then may be performed using the 2D key points and triangulation or other 3D point generation algorithms. Also, the camera parameters and/or pose estimates may be used to set and/or adjust the 3D pint locations. A first bundle adjustment then may be applied to generate adjusted 3D points. The adjusted 3D points then may be reconstructed on a 3D structure or model (or in a 3D space).

Process 200 may include "refine the locations of the 3D points in a 3D structure comprising using decoder prediction data to modify the location of the 3D points in a decoder-based bundle adjustment" 206. By one form, this may be performed by operating a cost function that uses the 3D points in blocks such as within re-projection macroblocks, and a representation of decoder-based point positions. By one example, a decoder-based bundle adjustment may be performed to modify the 3D point locations for better subjective, relatively long term accuracy in a video sequence. The decoder-based bundle adjustment may use inter-prediction data by one form, and may be a second bundle adjustment although it could be a first or other order number of bundle adjustments.

Specifically, the 3D points are re-projected from the 3D structure, after a first bundle adjustment for example, to 2D views of images to form groups of current re-projection images, each group being for a particular time T. The decoder data, such as current re-projection macroblock (or other size block) locations, are set on the re-projection images, and the 3D reconstructed points are projected to those macroblock locations. By one form, only the position of inter-prediction blocks are determined, and only 3D points within the re-projection macroblocks are used.

Also, the system may use frames output from the decoder-based second bundle adjustment with already modified 3D point locations as reference frames. The decoder data including reference lists are used to find which one or more previously adjusted reference frames are referenced by a current re-projection frame. Prediction macroblocks can then be positioned on the selected reference frames using motion vectors from the decoder data. By one form, the reference frames are stored in a group of reprojected pictures buffer (GRPB), and reference frames are dropped from the GRPB when no longer needed, as with typical decoder picture buffers (DPBs).

The reprojection and prediction macroblocks then may be used in the decoder-based bundle adjustment which minimizes the error in a non-linear error or cost function. The non-linear error function can be resolved by G2O or other such frameworks which each include a number of different algorithms to resolve the cost function. The cost function determines a minimum residual or difference between the prediction and reprojection MBs, and more specifically, the 2D points in the prediction MBs as observers, and the 3D points from the re-projection MBs converted by camera parameters to 2D points. The function solves for modified or refined 3D point locations.

Figure 3B:
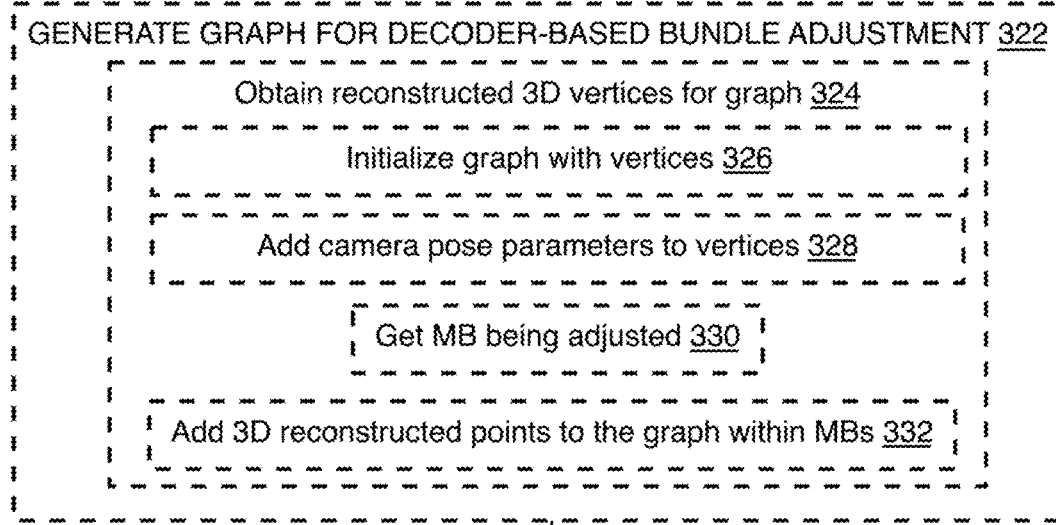
Figure 3C:
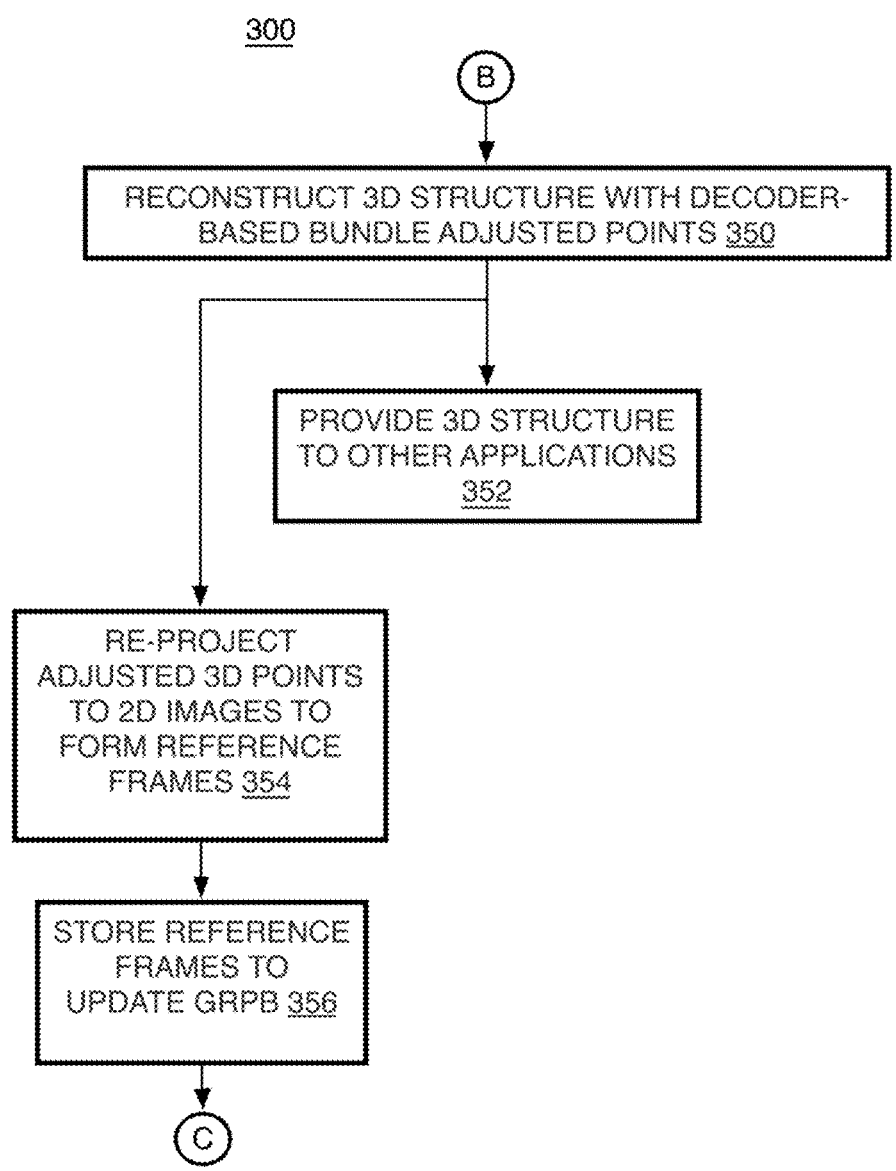

Referring to FIGS. 3A-3C, a process 300 is a method of image processing with increased subjective quality 3D reconstruction. In the illustrated implementation, process 300 may include one or more operations, functions, or actions 302 to 354 generally numbered evenly. By way of non-limiting example, process 300 may be described herein with reference to example image processing system 100 or 1100 of FIG. 1, 1A, or 11, and where relevant.

Process 300 may include "obtain compressed image data of multiple video frame sequences from different perspectives of the same scene" 302. This may involve obtaining multiple images of the same scene and at the same time (same or similar time stamp) as mentioned above. Often, this may involve a camera array around a stadium or arena to capture athletes in an athletic event, although many other scenarios or environments would be equally applicable. Alternatively, the scene may be captured by a single or few moving cameras for a non-moving fixed scene. It will be understood that such images should be pre-processed sufficiently for key point detection, 3D point generation or modeling, and bundle adjustment being performed herein. By one form, raw image data without depth information is obtained directly from cameras, pre-processed and provided to encoders for transmission to a decoding and 3D reconstruction system, whether on a visual cloud or other location. Otherwise, the compressed image data of the video sequences may be obtained from any memory.

Process 300 may include "decode the video frame sequences" 304. This involves a video stream with multiple video sequences (or with accompanying audio) and parameter data being demuxed and then provided to a decode unit with one or more decoders to decompress the video sequences using known video codecs such as H.264, HEVC, AVC, AV1, VP9, and so forth. The result is decompressed video sequences of frames. The term frame is used herein interchangeably with image or picture depending on the context.

Process 300 may include "store decoder data" 306, and this refers to obtaining the decoder data that can be used to increase the subjective quality of the 3D reconstruction later. This may include prediction data, and in one form, inter-prediction data. This may include the group of pictures (GOP) frame or slice type (I, P, or B for example), picture order count (POC) or timestamps, frame numbers (frame_num), coding tree unit (CTU) partitions which can be 8×8 to 64×64 where each tree leaf is a coding unit (CU) for HEVC for example, and 16×16 inter-prediction macroblock (MB) information including a start point (or anchor point) to locate the MB, a motion vector for individual blocks, and a reference list for the frame. By one form, intra and skip type macroblocks are ignored, and only inter macroblock information is stored. It will be noted that this data may differ depending on the codec that is being used by the decoder(s), especially for the partition sizes and arrangements. The decoder data may be stored in a memory that may or may not be separate from the groups of reconstructed pictures buffer (GRPB) described below.

Process 300 may include "place frames in decoder order" 308. The output video sequence from a decoder is typically in display order. The refinement of 3D points by using the decoder data, however, will require data, such as prediction MBs from reference frames, to generate differences between prediction MBs and reprojected MBs of the 3D points for example. Thus, the reference frames must be analyzed and generated before a current frame that uses those reference frames in the same order the decoder used the reference frames. This operation, then, reorders the decoded frames into decoder order rather than display order, and by using the POC and frame number, or using the presentation or decode time stamp (PTS/DTS) of the decoded frame.

Process 300 may include "determine 2D key points" 310. Here, the system determines key points of each image including each image of N views of the same time frame T. The system then matches the key points across multiple videos on images with the same timestamp or order number for example. The generation of 2D key points can be achieved through scale-invariant feature transform (SIFT), speeded up robust features (SURF), deep learning neural networks (DNNs) such as OpenPose as one example, or other similar feature point finding algorithms. Filtering algorithms such as random sample consensus (RANSAC) may be used to select inlier points. Confidence values output by deep learning networks can be used as a reference as well. The output of the key points determination is video sequences of initial 2D images each with detected 2D key points that can be used to generate 3D points.

Process 300 may include "generate 3D point locations on a 3D structure" 312, and this may be performed by the 3D points computation unit 110 (FIG. 1). As a preliminary matter, the camera poses relative to each other are factored into the computation. If the cameras already have been calibrated and have fixed position and orientation, then the calibrated intrinsic parameters K can be used as well as the rotational and translational conversion matrices R and Tr of each pair of cameras for example (as shown on FIG. 1). Otherwise, a pose estimation may be obtained if the camera parameters are unknown or the camera's pose changes. This may involve using the initial 2D images and detected key points $P_{2D}^N$ (2D points for N views) which are provided to pose estimation unit 114. An estimated rotational and translation matrix R and Tr are then provided for 3D points computation.

To generate the 3D points then, once adjusted for camera parameters, triangulation, other stereo camera techniques, and/or other types of 3D point generation techniques can use the 2D key points to get the 3D point coordinates in a 3D space (or model or structure).

Process 300 may include "perform first bundle adjustment to refine the 3D point locations" 314. Here, a first bundle adjustment performs a first 3D point location refinement. The bundle adjustment may minimize the residual error of a series of user cost functions (the reprojection errors of the structure $X_j$ to the images measures $x_j^i$). $X_j$ is a 3D point, $x_j^i$ is the observation of the projection of the 3D point $X_j$ in the image i, $P_i$ is the camera parameters or projection matrix of the image i.

During the bundle adjustment the camera parameters $\{P_i\}$, and the 3D points $\{X_j\}_j$ will be refined in order to minimize the residual reprojection cost. The 3D points $\{X_j\}_j$ that achieve the minimal residual will be used as a final output of the first bundle adjustment.

$$\{P_i\}_i, \{X_j\}_j \leftarrow \text{minimize} \left\| \sum_{j=0}^{m} \sum_{i=0}^{n} x_j^i - P_i X_i \right\|_2 \quad (1)$$

Process 300 may include "reconstruct 3D structure using first bundle-adjusted 3D points" 316, where the 3D space or structure is updated, or replaced, with the adjusted 3D point locations from the first bundle adjustment.

Process 300 may include "re-project adjusted 3D points to 2D planes to form re-projected adjusted 2D points" 318. Here this involves re-projecting the 3D structure, now constructed with 3D points adjusted from the first bundle adjustment, to N camera planes (or images or views) of frame T. The N camera planes will be used to determine which 3D points are in which re-projection $MB_{ij}$ described below.

Specifically, process 300 may include "obtain decoded re-projection MB locations" 320. Here, decoder information may be retrieved from memory, and specifically for the N view that is being analyzed. The decoder data may include start points of inter-prediction macroblocks (or other sized inter-prediction blocks) on an image. This is repeated for each N view. By one form, only the inter-prediction MBs are being used here.

When using G2O to perform the decoder-based bundle adjustment, a separate graph may be used where the 3D points within re-projection MBs will populate vertices on the graph. As explained in greater detail below, this is a probability model graph rather than a purely physical representation. Other vertices on the graph will be camera pose or parameter vertices. At this point, the graph is mentioned to setup the re-projection macroblocks.

Accordingly, process 300 may include "generate graph for decoder-based bundle adjustment" 322. Here, a separate graph may be generated to hold the data to be input to the decoder-based bundle adjustment algorithm (equation (2) below). For this graphing operation 322, process 300 may include "obtain reconstructed 3D vertices for graph" 324. This includes a number of operations to place 3D points re-projected to the re-projection MBs (or $MB_{ij}$'s) onto a graph. This may include "initialize graph with vertices" 326 to setup the graph. Then, if there are camera pose adjustments to be made, process 300 may include "add camera pose parameters to vertices" 328, and either by using the camera parameters and/or pose estimates mentioned above.

Thereafter, process 300 then may include "get MB being adjusted" 330, and this refers to obtaining the $MB_{ij}$ location already placed on the re-projection 2D image or plane (or obtaining it from the decoder data memory if not done already) as explained above, and determining which 3D points are re-projected into that re-projection $MB_{ij}$. This is repeated for each MB on the N re-projection 2D planes. The graphing operation 322 then may include "add 3D reconstructed points to the graph within MBs" 332, and by one example, the 3D points of all original 2D points including both intra-prediction and inter-prediction MBs may be used to build the graph. The 3D points may be added at the vertices as needed. By one form then, the graph can be constructed one MB at a time. Intra-prediction MBs are skipped as mentioned. This may be repeated image by image of a set of images N captured at the same frame time T and cooperatively used to form the 3D points. The construction of the graph may be performed by the reprojection MB unit 142 (FIG. 1A) by one example, and forms a graph 604 (FIG. 6) for multiple or all of the N planes described in greater detail below to be used for the decoder-based bundle adjustment.

Process 300 then continues with generating points that will act as control "state" observer points within the bundle adjustment algorithm, and in the form of points of prediction blocks or macroblocks MBs (or MB'$_{ij}$). The prediction MBs will be constructed from the reference data. Accordingly, process 300 may include "get reference frame list for current frame T" 334, and "obtain reference frames for the current frames" 336. There may be more than one reference frame, and often up to four reference frames, for a single current view (or 2D image) being analyzed, and this is determined for each view N at time (or frame) T. For example, a prediction for a $T^{th}$ frame will be based on data of a R×N re-projection view in which R is the number of a reference frame and N is the number of the camera view. The reference frame list $\{Ref_{1 \ldots k}\}$ for the $T^{th}$ frame may be obtained from decoder information in memory, and then the system obtains the corresponding reference frame $\{Ref_{1 \ldots k}\}$ from the GRPB.

As far as the operation of the GRPB, the life cycle and management of the GRPB may be similar to the operation of a decoder pictures buffer (DPB). Initially, the GRPB is empty. The system will check the decoder information to determine whether or not a current frame would be used as a reference frame for other frames. If so, the final reconstruction after the decoder-based bundle adjustment will be re-projected to N views to generate data of a group of reconstructed pictures, and the whole group is then stored in the GRPB. When reference frames are being uploaded to the GRPB and a frame type is an instantaneous decoder refresh (IDR) or clean random access (CRA) which starts a video sequence, the GRPB will be cleared of the previous reference frames. The GRPB may be monitored so that the system checks the GRPB with the processing of every current frame to determine whether frames already in the GRPB will not be used as a reference frame any more. If so, the system removes the stored views from the GRPB that are related to the unused or old frame. The maximum capacity of the number of groups in the GRPB at the same time may be the same as a conventional DPB. As a single current frame typically has no more than four reference frames, the maximum GRPB capacity usually will not need to be very large.

Once, or as, the GRPB reference frames are retrieved as indicated from the decoder data, the MB data may be retrieved and analyzed first view by view for frame T, and then MB by MB in each view. Accordingly, process 300 may include "traverse all N views of $T^{th}$ reprojection frame $\{F_1 \ldots N\}$" 338, also referred to as a current frame, and then "traverse all inter macroblocks MB$_{ij}$ in frame F$_i$," 340. Thus, the system can generate a predicted macroblock MB'$_{ij}$ by using the reference MBs assigned to the MB$_{ij}$ and on the reference frames $\{Ref_{1 \ldots k}\}$ for each or individual current macroblocks MB$_{ij}$ on the re-projection frame F$_i$.

For example, process 300 may include "determine prediction MB location points" 342, and this refers to using the re-projection macroblock locations MB$_{ij}$ to determine the location of prediction macroblocks MB'$_{ij}$, and in turn the location of the 2D points $x_{k,j}{}^i$ that will be used in the decoder-based bundle adjustment algorithm (equation (2) below) as the observer. Determining the prediction MB location does not require the typical decoding motion compensation operations. Instead, since the decoder MB$_{ij}$ locations on the re-projection 2D images or planes F$_i$ and motion vectors MV$_j$ are already available, adding the motion vector to the reprojection MB$_{ij}$ location as overlaid on a previous reference frame (from the GRPB and assigned to the MB$_{ij}$ in the decoder data as one of its reference frames) creates the prediction MB'$_{ij}$ location on a subsequent (GRPB) reference frame (or now a current frame). The retrieval of the decoder data may include obtaining the MB locations as well as the motion vectors of each of the MBs from memory which may or may not be a different memory from the GRPB.

Figure 4:
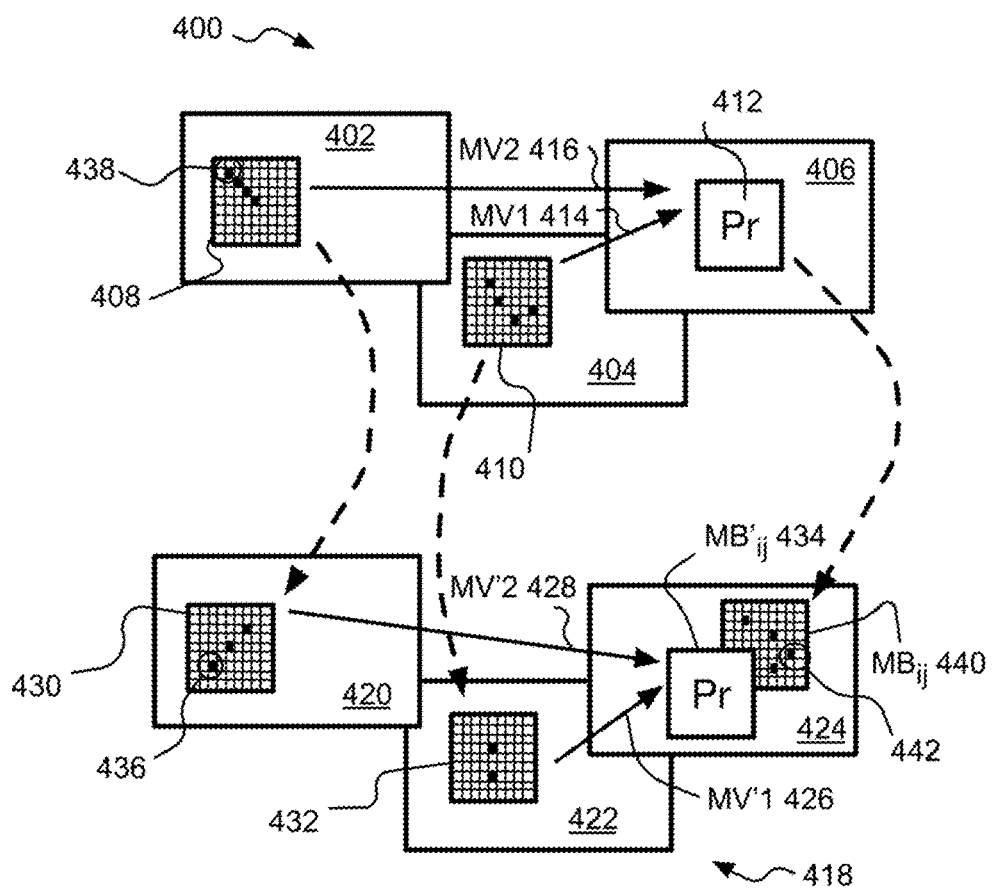
FIG. 4 a schematic diagram to explain block matching for decoder data-based bundle adjustment in accordance with at least one of the implementations disclosed herein.

Referring to FIG. 4 to assist with explaining the locating of the prediction MB'$_{ij}$, a video sequence 400 has the original decoded frames 402, 404, and 406 of decoder data in decoder order, and is shown for comparison to a sequence 418 of the re-projection reference frames F$_i$ (420, 422, and 424). The decoded frames show reference frames 402 and 404 used by a current frame 406, although other numbers of reference frames could be used such as one to four. Thus, the current frame 406 may be considered at a time T, while the reference frames 402 and 404 may be at various types of frames, such as p-frames, and may be set at T−1 or T−2 relative to the time T. Otherwise the current frame may be a B-frame where one of the reference frames 402 or 404 is at T+1, and so forth. Each reference frame 402 and 404 respectively has an MB reference block 408 and 410 used to form a prediction block 412 on the current frame 406. The decoder memory here may store the anchor address (usually the upper left corner) of the reference blocks 408 and 410 as well as respective motion vectors 416 and 414 that are set at the MB reference anchor points to indicate the location of the prediction block 412 on the current frame. The prediction block location actually may be set in a number of different ways such as by averaging the motion vectors, and so forth. The decoder reference frame numbers, motion vectors, and reference block (MBs) addresses on the decoder reference frames addresses form at least part of the decoder data placed in memory along with indication.

Turning to the re-projection sequence 418, the current frame is frame F$_i$ 424 being analyzed, and for a re-projection MB$_{ij}$ 440 as mentioned above where the set of 2D points 442 within the MB$_{ij}$ 440 each represent a 3D point reprojected into the MBij 440. The re-projection MB$_{ij}$ location matches the location of the original decode data MB$_{ij}$, which was the original prediction block location 406 on the decoder data. Once the location of MB$_{ij}$ is determined, then the location of its reference frame MBs and MVs can be obtained. In this example, the reference MB location 430 on reference frame 420 and reference MB location 432 on reference frame 422 are both obtained as GRPB reference frames from the GRPB, and as designated in the decoder data. The dashed arrows show the use of decoder data block locations (without copying the content).

Each re-projection reference MB location 430 and 432 may the same location as the locations of the decoder reference MBs 408 and 410, except that the content of the MBs may be very different. The content of the decoder reference MBs 408 and 410 is the original decoded image data while the content of the re-projection reference MB locations 430 and 432 are 2D points generated from the re-projection of the 3D points and revised by the decoder-based bundle adjustment. Thus, the 2D point set 436 of the re-projection MB 430 may be very different than (or offset from) the 2D point set 438 of the decoder MB 408, and this difference occurs for re-projection reference frame 422 and any of the other re-projection reference frames that are obtained from the GRPB. Also, the re-projected 2D points in the reference MBs (430 and 432), which were MB$_{ij}$'s when the frames 420 or 422 were current frames, may not form a rectangular set of points but are treated as rectangular MBs for ease of description.

Next, the motion vectors MV'1 426 and MV'2 428 (which are the MVs 414 and 416 from the decoder data) are added to the re-projection MB locations 432 and 430 respectively to determine the location of the prediction block MB'$_{ij}$. This may be determined in a number of different ways whether the same algorithm as that used by the decoder or a different way. By some forms, two different prediction blocks could be averaged whether non-weighted or weighted differently. The 2D points may be stored and used as integer coordinates or floating point coordinates. Interpolation may be used to provide ½, ¼, or ⅛ pixel accuracy, and so forth.

Whether computed by a different way, or because the re-projection 2D image data of the content of the re-projection MBs 430 and 432 are being used (rather than original decoded data), the prediction block MB'$_{ij}$ very well may be a different location on the current frame 424 than the MB$_{ij}$ 440.

This is repeated for each macroblock MBij on a current frame 424. Those 2D points in the prediction macroblocks MB'$_{ij}$ 434 will be used as observers and may be compared to the points in the corresponding re-projection macroblock 440 in the decoder-based bundle adjustment to form residuals as described below.

Once a re-projection MB$_{ij}$ is selected and retrieved and its prediction macroblock(s) MB'$_{ij}$ are determined, process 300 may include "determine second bundle adjustment" 344, where the 3D point locations may be modified by minimizing the total residual of the differences between the 2D points of the prediction blocks and the 3D points converted to 2D points by camera parameters. It should be noted that the 2D re-projection points from the re-projection frames (i.e. the re-projection frames 420, 422, and 424 explained above) are not directly used in the cost function of the decoder-based bundle adjustment algorithm. Those re-projection frames are merely used to determine which 3D points are within a re-projection MB (which 3D points are considered within (or members of) MB$_{ij}$ 440 for example) and should be input to the cost function.

A number of different non-linear error or cost functions can be used to generate the modified 3D points, such as Gauss-Newton, Levenberg-Marquardt, Powell's Dogleg technique for Hessian and preconditioned conjugate gradients (PCG) algorithms, and/or Sparse technique for Ceres Solver, and so forth.

However, by the examples herein, the G2O technique is used to solve the non-linear error or cost function such as the bundle adjustment (and which is known to use some of the techniques just mentioned as sub-operations). G2O is a technique to find a configuration of parameters and state variables that maximally explain a set of measurements affected by Gaussian noise. The G2O uses vertices (or nodes) connected by edges that each represent a constraint. The edge represents a 3D to 2D projection as a measurement method, where the 3D reconstruction point X$_k$ (forming one vertex) from the re-projection macroblocks is projected to a 2D point by a camera positioned and oriented at P$_k$ (which is the other vertex of the edge). The other 2D points being differenced from the 3D reconstruction points is the observer in the form of 2D points x$_{k,j}{}^i$ in the prediction macroblocks.

Figure 6:
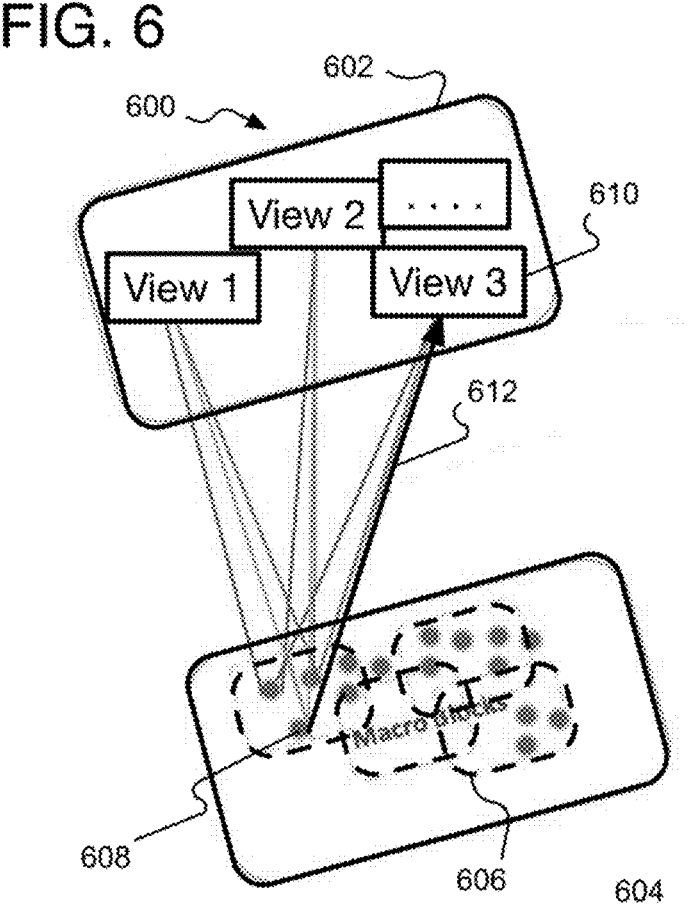
FIG. 6 is another schematic diagram to explain edges for decoder data-based bundle adjustment in accordance with at least one of the implementations disclosed herein.

Referring to FIG. 6, a setup 600 shows a visualization of the edges for the second bundle adjustment using G2O, and setup 600 may be considered a G2O probability graph. The group 602 of camera vertices 610 each shown as view 1, view, 2, view 3, and so forth all of frame T, each represent camera parameters or a projection matrix P$_k$. Also, a group 604 of re-projection macroblocks 606 includes 3D point vertices 608 each being a 3D point X$_k$. It will be understood that actually, the 3D points as re-projected into 2D points on a 2D plane or 2D image (or view) is within the 2D macroblocks 606, and the group 604 merely shows a representation of the re-projection. Edges 612 represent a measure of the conversion of the 3D points to 2D points to generate the residual between each 3D point as one vertex and the observer 2D points in a prediction macroblock as the other vertex. The details for determining the residual as used for the disclosed decoder-based bundle adjustment residual minimization are as follows.

Referring again to FIG. 4 to explain the residuals, the residuals are between the 3D points of the re-projection MB$_{ij}$s and 2D points of the prediction (or decoder) MB'$_{ij}$s. The prediction (or decoder) MB'$_{ij}$s is represented on the video sequence 422 as the prediction (or decoder) MB'$_{ij}$ 434 from the GRPB re-projection reference frame 424. Thus, it can be seen how prediction (or decoder) MB 434 from GRPB reference frame 424 is misaligned relative to re-projection MB 440 on re-projection frame 424. This misalignment also will occur between each re-projection MB and its corresponding prediction (or decoder) MB on frame 426 on each re-projection frame. These misalignments occur, at least in part, due to likely errors introduced by camera intrinsic parameter calibration errors, rotation-translation matrix estimation errors, and 3D reconstruction triangulation errors. In addition, since the first bundle adjustment only considers LMSE on single frames, it does not sufficiently and accurately consider motion over a relatively large number of frames. Given these limitations, and while some points are sufficiently close to their original positions, motion indicated by vectors between originally decoded frames is very different than the resulting motion after the originally decoded frames are used for 3D reconstruction and reprojection, thereby significantly increasing accuracy when the motion vectors are considered.

Figure 5:
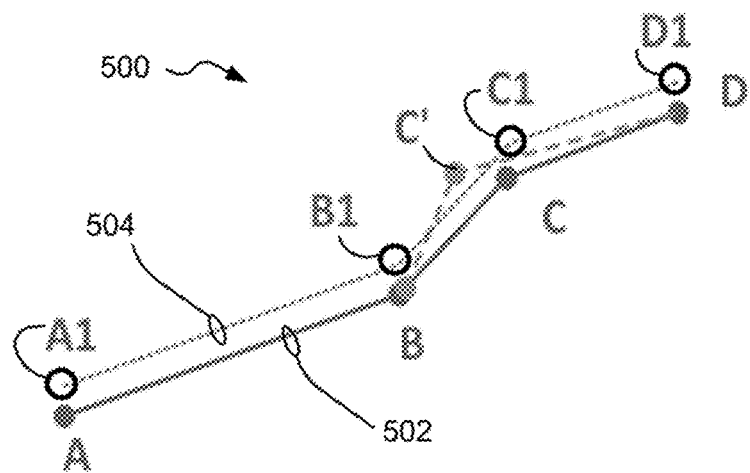
FIG. 5 is a schematic diagram to explain residuals for decoder data-based bundle adjustment in accordance with at least one of the implementations disclosed herein.

Referring to FIG. 5 to show the misalignments and correction by the bundle adjustment residuals, a video sequence 500 is represented by alternative trajectories of a point Q on a moving object on four frames of the video sequence to compare an ideal re-projection trajectory 502 and a trajectory 504 forming residuals based on the G2O edges (although other algorithms could be used as mentioned above). Generating the edge should minimize an error of all MB$_{predicted}$-MB$_{re-projected}$. Suppose Point Q's trajectory 502 is (from left to right) A, B, C, D over four frames of a video sequence. Then, using the first bundle adjustment, minimizing LMSE causes a trajectory A, B, C', D. Thus, while bundle adjusted A and D are correct and ideal, and B is merely very slightly off, C' is not in correct alignment and will cause a visible jump in an object's motion to a viewer watching a display of the video. Although actually, this error may need to occur over a minimum number of frames to be visible, it is assumed for explanatory purposes here that the single frame error is visible and reduces the subjective quality of the video. The edge-based residual is used to compensate for this and form the trajectory 504 of points, in order, of A1, B1, C1, D1, even though the edge residual mean square error (RMSE) might result in 2D, and in turn 3D, points being a little offset from the ideal reprojection points ABCD, the subjective visual quality will be improved because the residual is more uniform over many points and therefore, the movement trajectory is smoother than the conventional bundle adjustment results even though more of the points are slightly off of ideal. Since typically the refinement may be one pixel (merely [−1, 1] pixel modification) by the edge, the overall structure should not be significantly affected. Thus, the edge-based residual better provides point adjustment for human eye perception or sensitivity.

Included in the decoder-based second bundle adjustment, the bundle operation may include "determine sum of residuals" 346, and then "perform second bundle adjustment residual minimization" 348. Particularly, the second bundle adjustment residual minimization may be determined as follows:

$$\text{minimize} \left\| \sum_k^{views} \sum_{j=0}^{blocks} \sum_{i=0}^{points} x_{k,j}^i - P_k X_k \right\|_2 \quad (2)$$

where k is a count of the view in frame T, j is the count of MBs on a view k, and i is the count of points in a prediction macroblock MB'$_{ij}$. $x_{k,j}^i$ is a 2D image point from the prediction macroblocks on the reference frames as explained above, and $P_k X_k$ is a 3D point $X_k$ within a re-projection macroblock (or more particularly, has a 2D point reprojection that is within the re-projection MB). The 3D point $X_k$ is converted to a 2D for the residual subtraction in equation (2) by camera projection or parameter matrix $P_k$. As mentioned, each 3D point that is related to an MB$_{ij}$ and the F$_i$ view's camera projection parameters $P_k$ are the two vertices that form an edge while the difference between MB'$_{ij}$ and MB$_{ij}$ is the residual. Thus, it can be stated that the cost of MB$_{ij}$ to the bundle adjustment is an edge-based residual.

Every time an edge is formed (the 3D point is converted to 2D with the camera parameters), the "edge" can be subtracted from the 2D observer points, and then the edge-based residual can be cumulated into the residual sum in the bundle adjustment equation.

The decoder-based bundle adjustment then may include minimizing the residual between the reprojected 2D points of the edge-modified 3D points (or point locations) and the initial 2D key points on the initial 2D image of the view being analyzed. This of course may be performed as the edge-based residuals are being added, and nodes are being added to the graph, over a number of iterations. The number of iterations may be limited by time limit, experimentation, reaching a certain quality or performance criteria, and so forth.

Either after the minimization is complete, or when the graph is sufficiently constructed, for considering all views N of a frame T, the resulting output of the G2O or other such known framework algorithms is the residual and modified 3D points that is the basis of all views related to a frame T and that is modified by considering decoder data as described above.

Process 300 may include "reconstruct 3D structure with decoder-based bundle adjusted points" 350. Here, the 3D structure is replaced or updated as with the earlier reconstruction, except this time with 3D points that were constructed by factoring the decoder data to increase subjective quality.

Process 300 may include "provide 3D structure to other applications" 352. The refined 3D reconstructed structure then can be output to other display applications or 3D analysis applications, and when the 3D reconstruction is on a visual cloud, the 3D structure may be encoded and transmitted to devices with other applications that will use the 3D structure. This may include applications such as games, virtual or augmented reality, entertainment, surveillance, and other applications that generate either camera views or virtual views from the 3D structure, and many others.

Process 300 may include "re-project adjusted 3D points to 2D images to form reference frames" 354. This operation involves re-projecting the 3D points output from the second bundle adjustment and reconstructed on a 3D structure as mentioned. These frames, which should have increased accuracy, are used as reference frames to provide the observer data. This may be performed for all frames regardless of the type of frame because any frame, including intra frames, could be used as reference frames. Process 300 then may include "store reference frames to update the GRPB" 356, and as described above to manage the GRPB.

Example Pseudocode for G2O Bundle Adjustment Error Function

A G2O framework may be used to improve the subjective quality as shown below. The pseudo code below uses GRPB operation and edge-based second bundle adjustment core modules to provide images that consider human eye perception and sensitivities, and reduce jitter that can be perceived by humans' eyes.

Input: Information structure from decoded compressed stream: FrameInfo$_N$
   Cameras intrinsic and extrinsic parameters: CameraInfo$_N$
   2D point and 3D point mapping relations: PointsMap
   3D point coordinates from the first bundle adjustment: Points3D Output: The refined 3D points coordinates: Points3D
RefineToImproveQuality(FrameInfo$_N$, CameraInfo$_N$, PointsMap, Points3D)

```
{
    /** 1. Graph initialization for bundle adjustment **/
    /* Linear Solver can choose from PCG, CSpare, Choldmod */
    Solver = G2o.BlockSolverSE3(LinearSolverCholmodSE3( ))
    Solver = G2o.OptimizationAlgorithmLevenberg(solver)
    /* Algorithm can choose from Gauss-Newton, Levenberg-M, Powell Dogleg */
    Ba->setAlgorithm(solver)
    /* * 2. Add the camera projection parameters to vertex of graph **/
    forall i in CameraInfo_N do
        Ba->addPose (CameraInfo_i, i)
    /** 3. Set up the edge and its Observers to the graph **/
    if Frametype(FrameInfo_N) == Inter_B or Inter_P
    {
        /* Get the GRPB date to reconstruct MB as observer */
        GRPB = getGRPB( );
        forall FrameInfo_i in FrameInfo_N
        {
            forall MacroBlock_j in FrameInfo_i
            {
                if MacroBlock_j is INTER then /* Motion MB */
                {
                /** 4. Add 3D reconstruction points related to this MB to vertex of graph **/
                    /* Add all 3D points related to this MB to vertex */
                    Ba->addPoint(index, Macroblock_j Falses)
                        /* Get reference list from decode information */
                        vector_reference = getRefLiset(Macroblock_j)
                            /* Get motion vectors from decode information */
                        vector_mv = getMvOfMb(Macroblock_j)
                        /* Using previous reconstructed pictures and MVs to get predicted MB*/
                        predictMbFromMv =
                reconstructedMb(vector_reference, vector_mv, GRPB)
                    /** 5. Add the edge for graph **/
                        /* residual between n MB'_ij and MB_ij as the cost function */
                        Ba->addEdge(Macroblock_j, i, index, predictMbFromMv)
                        index++
                }
```

-continued

```
        }
    }
    /** 6. Set the max time of optimization and do bundle
        adjustment **/
        Ba->optimize(max_iterations)
    } /* finish bundle adjustment */
    /** 7. Re-project final reconstructed structure to N views for next
    frames **/
    N_view_data = reproject_N_views(Points3D)
    /** 8. Update the GRPB **/
    UpdateGRPB(N_view_data)
}
```

Experiments

Some basic experiments have been done on the proposed algorithm to compare with previous solutions. In order to simulate the real situation of a visual cloud, two types of compressed streams have been used for the test, namely, miniGOP [I P P P P P . . . ] and [I B B B P B B B P . . . ], which are often used for low latency or high compression ratios. Since the proposed method and system may use a large amount of processing, the number of compressed streams (or views) is taken into consideration during the tests.

Structural Simulation (SSIM) Index Measure Comparison

For both the conventional 3D reconstruction bundle adjustment and the 3D reconstruction bundle adjustment disclosed herein, the test calculated and compared SSIM luminance (SSIM-Y) of the re-projected images versus the original decoded images for N views. The final result is an average SSIM-Y value of all views. Table 1 and 2 respectively show the comparison of SSIM-Y for IPPPPPP and IBBBPBBP.

TABLE 1

SSIM compared with original decoded images for IPPPPPP

| N Views | Original Algorithm (SSIM-Y) | Disclosed Algorithm (SSIM-Y) |
| --- | --- | --- |
| 8 | 0.915 | 0.932 |
| 10 | 0.922 | 0.935 |
| 12 | 0.924 | 0.938 |

TABLE 2

SSIM compared with original decoded images for IBBBPBBBP

| Views | Original Algorithm (SSIM-Y) | Disclosed Algorithm (SSIM-Y) |
| --- | --- | --- |
| 8 | 0.914 | 0.928 |
| 10 | 0.919 | 0.932 |
| 12 | 0.923 | 0.933 |

Performance Test

For different frames, the proportion of inter-prediction macroblocks on an entire image varies, as shown in FIG. 7. Therefore, the amount of newly added calculations also varies. Table 3 and Table 4 show the average execution time (in seconds) of the total 3D reconstruction pipeline from decoder to reconstruction after the last bundle adjustment, which is the edge-based second bundle adjustment for the disclosed method, and of the same entire video sequence. A complete re-projection for an entire image was not necessary, however, since only the parts of an image that needed to be refined could be adjusted. Thus, the amount of calculations can be reduced when results from a previous bundle adjustment can be reused for a later re-projection that is being performed for a reference added for GRPB.

TABLE 3 performance impact for IPPPPPP

| Views | Original Execution Time | Proposed Execution Time | Difference |
| --- | --- | --- | --- |
| 8 | 171 s | 197 s | 15.20% |
| 10 | 211 s | 243 s | 15.16% |
| 12 | 249 s | 287 s | 15.26% |

TABLE 4 performance impact for IBBBPBBBP

| Views | Original Execution Time | Proposed Execution Time | Difference |
| --- | --- | --- | --- |
| 8 | 172 s | 201 s | 16.86% |
| 10 | 211 s | 246 s | 16.58% |
| 12 | 249 s | 290 s | 16.46% |

Subjective Quality

Referring to FIG. 8, the disclosed method takes advantage of decoder information from visual cloud compressed streams together with the use of the GRPB to improve subjective quality of 3D reconstructed video. In order to show the subjective effect more clearly, the subjective test used a video with a moving human and a static background for testing. As shown in FIG. 8, an image 800 shows motion vector information of the human with light colored MBs having motion.

Referring to FIGS. 9A-9D, and as mentioned before, while the conventional solution can still generate good reconstructed images, the sensitivity of the human eye will cause a person to see jumps and jitter while watching a continuous video of the images over a certain amount of time or number of frames, which can give the person an unsatisfying viewing experience. On this regard, the disclosed algorithm removes or lightens this jitter. Resulting reconstructed 3D space or structure screen shots 902, 904, 906, and 908 show the positions of the human at various time or frames T which actually represents time points or screen shots of a video of the 3D space. While not discernable here, the smoothness of motion in the video showed that jitter was reduced. To better analyze the performance, only some key skeletal points of the moving object were shown in the video to compare different runs of the video.

Referring to FIGS. 10A-10B, another video was run that shows a 3D reconstruction structure showing the motion of hands of a person. The test compared the subjective quality of reconstructed left and right hands that were continuously moving. While not discernable here, screen shots 1000 and 1002 of the video represent the smoothness of the motion in the video.

In addition, any one or more of the operations of FIGS. 2 and 3A-3C may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 11:
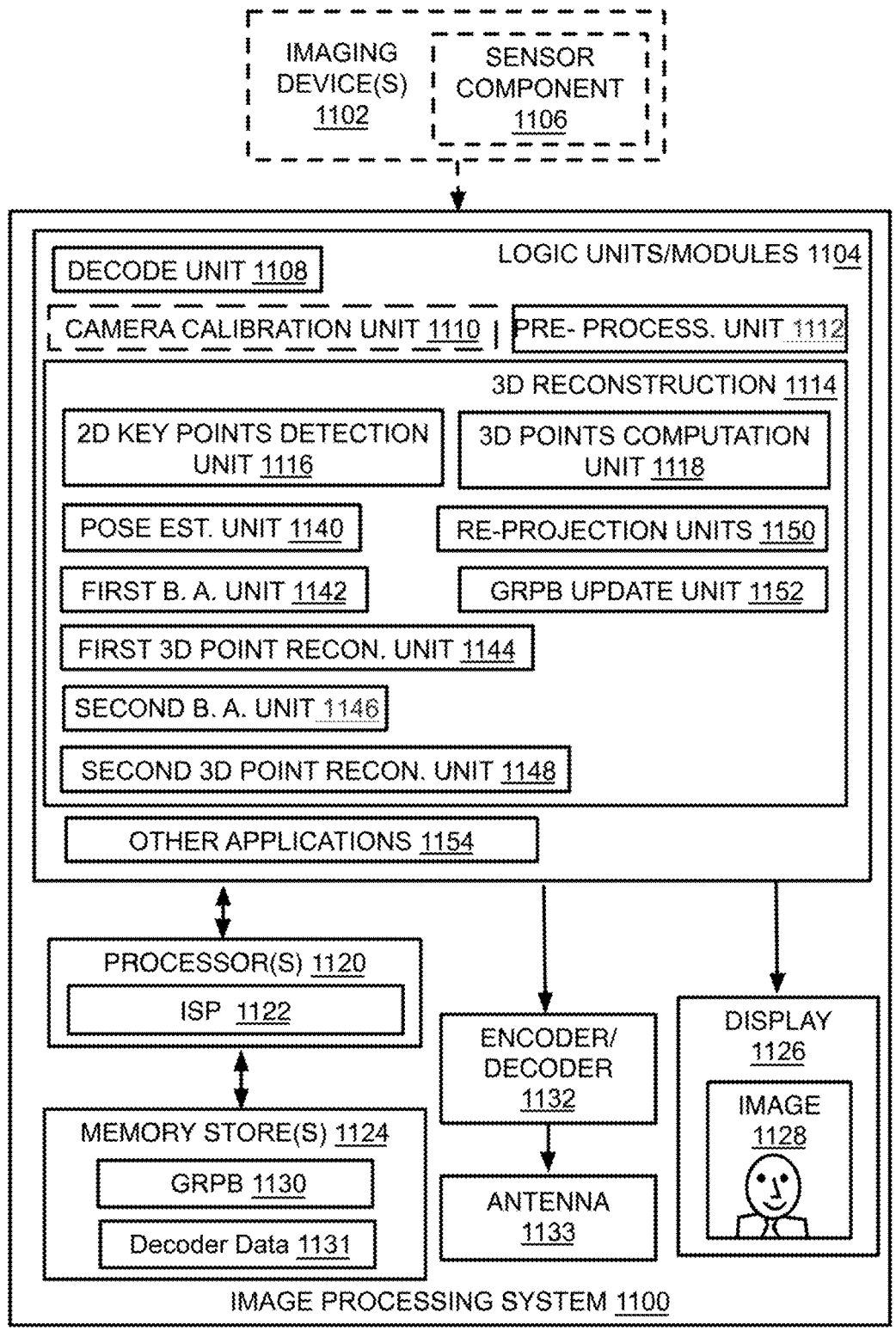
FIG. 11 is an illustrative diagram of an example system.

Referring to FIG. 11, an example image processing system 1100 is arranged in accordance with at least some implementations of the present disclosure. In various implementations, the example image processing system 1100 may be communicatively connected to local or remote one or more image processing systems or devices 1102 to form or receive captured image data and analyze the image data. This can be implemented in various ways. Thus, in one form, the image processing system 1100 may be, or may be located on, a visual cloud or other remote location such as a server, computer, computer network, and so forth. In these examples, image processing system 1100 may be considered to have a remote imaging device 1102 that includes or may be one or more cameras, and logic modules 1104 may communicate remotely with, or otherwise may be communicatively coupled to, the imaging device 1102 for further processing of the image data, and the imaging devices have sensor components and other components 1106 for capturing images, generating raw image data, and encoding the images to transmission to a decode device. In other cases, the image processing system 1100 is or has a local one or more cameras or other image capture devices 1102, and the logic units and modules 1104 may be the camera hardware and camera sensor software, module, or component 1104 for the devices 1102.

Thus, image processing system 1100 may be or have a device with one or more cameras of a camera array such as that placed around a stadium to record athletes but could be placed around other environments. Otherwise, the camera array could be placed on a multi-use device such as a smartphone, tablet, laptop, or other mobile device, or even a computer or other computing device. Also, imaging device(s) 1102 may be a tablet or other device with multiple cameras where the image processing including the 3D reconstruction processing occurs at one of the cameras or at a separate processing location communicating with one or more of the cameras such as the visual cloud mentioned herein, where the processing location may be remote from the one or more cameras, and any of the devices mentioned herein may be mobile devices.

The form of the imaging or image capture devices 1102 is not limited except to provided compressed video sequences as described herein. These controls may be part of the sensor module or component 1106 for operating the sensor s mentioned. The sensor component 1106 may be part of the imaging device 1102, or may be part of the logical modules 1104 or both. Such sensor component can be used to generate images for a viewfinder and take still pictures or video. The imaging device 1102 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 1102 may be provided with an eye tracking camera. The imaging device 1102 may have any other relevant component for capturing images consistent with the method and system described herein.

In the illustrated example, the logic modules 1104 may have a decode unit 1108 as described above, and a camera calibration unit 1110 that provides any of the calibration data including extrinsic and/or intrinsic parameters, translation, rotation, and/or projection matrices, pose data, distances and relative orientation data between cameras as well as any other calibration data necessary for performing the 3D reconstruction and other image processing described herein. A pre-processing unit 1112 receives and modifies raw image data for further processing and as described above when necessary for encoding and transmitting of data, or for 3D reconstruction preparation when needed.

Otherwise, the logic units or modules 1104 may include a 3D reconstruction unit 1114 that may have all necessary units for decoder-data-based 3D reconstruction as described herein. Then, other subsequent applications 1154 may be present that use the output modified 3D structure whether virtual view entertainment systems, video games, commercial programs, and so forth. More specifically, the 3D reconstruction unit 1114 may have a 2D key point detection unit 1116, a 3D points computation unit 1118, a pose estimate unit 1140, a first bundle adjustment unit 1142, a first 3D point reconstruction unit 1144, at least a second bundle adjustment unit 1146, at least a second 3D point reconstruction unit 1148, one or more re-projection units 1150, and a GRPB update unit 1152. These units are titled so that the units at least perform the tasks clearly associated with the operations in the methods described above although variations could be used.

The logic modules 1104 may or may not be located physically separate from the imaging device, and regardless of any physical separation, the logic modules 1104 still may be considered to be part of the imaging device or system when performing tasks on data provided by the imaging device. It will also be understood that any of these units may include any code or hardware that is used to perform the tasks suggested by the title of the unit, and may or may not actually be a physically separate object, or separate section of code, from other objects or code that perform other tasks.

The image processing system 1100 may have one or more processors 1120 which may include a dedicated image signal processor (ISP) 1122 such as the Intel Atom, memory stores 1124 which may or may not hold image data and/or 3D reconstruction related data such as one or more GRPB buffers 1130 and a decoder data memory 1131. An encoder and/or decoder 1132 also may be used to compress or decompress 3D reconstruction related data. The system 1100 may have one or more displays 1126 to display images 1128, and antenna 1133 to transmit or receive data. In one example implementation, the image processing system 1100 may have the at least one processor 1120 communicatively coupled to memory 1124. It will be understood that the encoder/decoder 1132 may include a decoder to receive and decode image data for processing by the system 1100, including to perform 3D reconstruction operations by the 3D reconstruction image 1114. As illustrated, any of these components may be capable of communication with one another and/or communication with portions of logic modules 1104 and/or imaging device 1102. Thus, processors 1120 may be communicatively coupled to both the imaging devices 1102 and the logic modules 1104 for operating those components. By one approach, although image processing system 1100, as shown in FIG. 11, may include one particular set of blocks or actions associated with particular components or modules, these blocks or actions may be associated with different components or modules than the particular component or module illustrated here.

Figure 12:
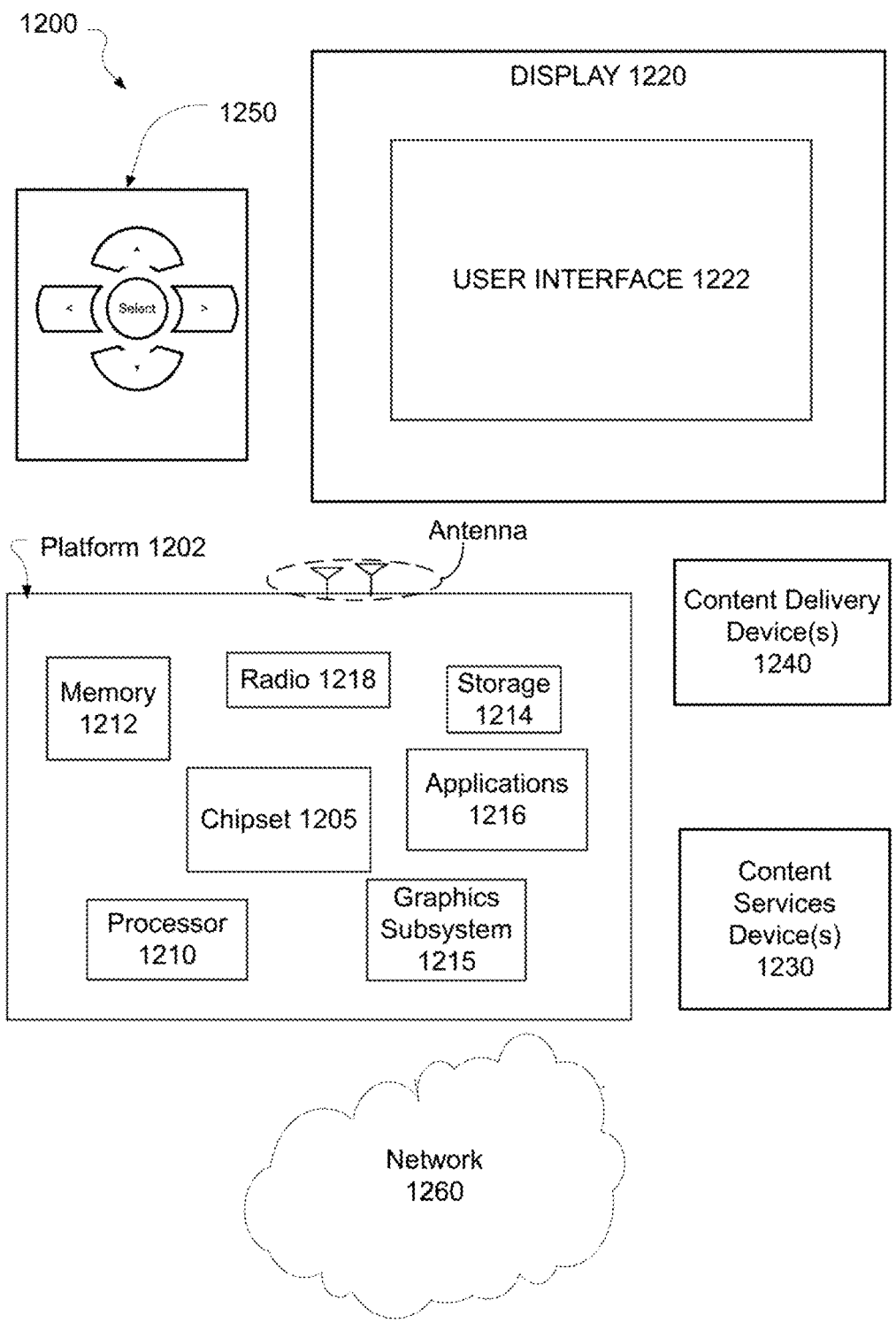
FIG. 12 is an illustrative diagram of another example system.

Referring to FIG. 12, an example system 1200 in accordance with the present disclosure operates one or more aspects of the image processing system described herein. It will be understood from the nature of the system components described below that such components may be associated with, or used to operate, certain part or parts of the image processing system 1100 described above. In various implementations, system 1200 may be a media system although system 1200 is not limited to this context. For example, system 1200 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, Display Port, wireless HDMI, and/or wireless HD compliant techniques. Graphics subsystem 1215 may be integrated into processor 1210 or chipset 1205. In some implementations, graphics subsystem 1215 may be a stand-alone card communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of unidirectionally or bidirectionally communicating content between content providers and platform 1202 and/display 1220, via network 1260 or directly. It will be appreciated that the content may be communicated unidirectionally and/or bidirectionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In implementations, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In implementations, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 12.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various implementations, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various implementations, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 12.

Referring to FIG. 13, a small form factor device 1300 is one example of the varying physical styles or form factors in which systems 1100 or 1200 may be embodied. By this approach, device 1300 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone 1314, or may be digitized by a voice recognition device. As shown, device 1300 may include a camera 1305 (e.g., including at least one lens, aperture, and imaging sensor) and a flash 1310 integrated into back 1302 (or elsewhere) of device 1300. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, at least one non-transitory computer-readable medium having stored instructions thereon that when executed cause a computing device to operate by obtaining image data of decoded video frame sequences of the same scene from multiple perspectives; generating a 3D structure of 3D points using the image data; and refining the location of the 3D points in a 3D structure comprising using decoder prediction data to modify the location of the 3D points in a decoder-based bundle adjustment.

By one or more second implementations, and further to the first implementation, wherein the decoder-based bundle adjustment comprises performing a cost function that determines differences between observer points and a version of the 3D points to generate a residual.

By one or more third implementations, and further to the first or second implementation, wherein the refining comprises using decoder data to group the 3D points into reprojection macroblocks to compare a version of the 3D points to points in prediction macroblocks.

By one or more fourth implementations, and further to the first or second implementation, wherein the refining comprises using decoder data to group the 3D points into-re-projection macroblocks to compare a version of the 3D points to points in prediction macroblocks, and wherein the refining comprises re-projecting the 3D points into re-projection macroblock locations.

By one or more fifth implementations, and further to the first or second implementation, wherein the refining comprises using decoder data to group the 3D points into-re-projection macroblocks to compare a version of the 3D points to points in prediction macroblocks, and wherein the refining comprises using a cost function that converts the 3D points of the re-projection macroblocks into 2D points by using camera parameters.

By one or more sixth implementations, and further to the first or second implementation, wherein the refining comprises using decoder data to group the 3D points into-re-projection macroblocks to compare a version of the 3D points to points in prediction macroblocks, and wherein the refining comprises using a cost function that converts the 3D points of the re-projection macroblocks into 2D points by using camera parameters, and wherein the coupling of camera parameter and 3D point forms a general graph optimization (G2O) edge in the cost function.

By one or more seventh implementations, and further to any of the first to sixth implementation, wherein the refining comprising determining observer points of prediction macroblocks of the decoder data placed on frames being refined.

By one or more eighth implementations, and further to any of the first to sixth implementation, wherein the refining comprising determining observer points of prediction macroblocks of the decoder data placed on frames being refined, and wherein the refining comprises designating frames output from the decoder-based bundle adjustment as reference frames of the frames being refined.

By one or more ninth implementations, and further to any of the first to sixth implementation, wherein the refining comprising determining observer points of prediction macroblocks of the decoder data placed on frames being refined, and wherein the refining comprises storing the reference frames in a reference frame buffer.

By one or more tenth implementations, and further to any of the first to sixth implementation, wherein the refining comprising determining observer points of prediction macroblocks of the decoder data placed on frames being refined, and wherein the refining comprises storing at least one group of pictures with one frame of each video frame sequence of a different one of the perspectives and of a same time.

By one or more eleventh implementations, a computer-implemented system comprises memory; and at least one processor communicatively connected to the memory and being arranged to operate by: obtaining image data of decoded video frame sequences of the same scene from multiple perspectives; generating a 3D structure of 3D points using the image data; and refining the location of the 3D points in a 3D structure comprising using decoder prediction data to modify the location of the 3D points in a decoder-based bundle adjustment.

By one or more twelfth implementations, and further to the eleventh implementation, wherein refining comprises having the decoder-based bundle adjustment perform a cost function comparing 2D points from prediction macroblocks on reference frames with a 2D version of 3D points of re-projection macroblocks on current frames.

By an example thirteenth implementation, and further to the eleventh implementation, wherein refining comprises having the decoder-based bundle adjustment perform a cost function comparing 2D points from prediction macroblocks on reference frames with a 2D version of 3D points of re-projection macroblocks on current frames, and wherein the cost function minimizes a residual between the 2D points and the 2D version of the 3D points.

By one or more fourteenth implementations, and further to the eleventh implementation, wherein refining comprises having the decoder-based bundle adjustment perform a cost function comparing 2D points from prediction macroblocks on reference frames with a 2D version of 3D points of re-projection macroblocks on current frames, and wherein the cost function minimizes a residual between the 2D points and the 2D version of the 3D points, and wherein the 3D points are converted to the 2D version of the 3D points by camera parameters.

By one or more fifteenth implementations, and further to any of the eleventh to fourteenth implementations, wherein the decoder prediction data is decoder motion prediction data that comprises at least one of one or more macroblock locations, motion vectors, identification of one or more reference frames, and identification of group of pictures frame type.

By one or more sixteenth implementations, and further to any of the eleventh to fifteenth implementation, wherein the at least one processor operates by: performing a first bundle adjustment that does not use the decoder prediction data, performing a first 3D reconstruction after the first bundle adjustment, performing at least one decoder-based bundle adjustment that uses the decoder prediction data, and performing a second 3D reconstruction that modifies 3D point locations on a structure at least partly depending on the decoder-based bundle adjustment.

By one or more seventeenth implementations, a computer-implemented method of image processing, comprising: obtaining image data of decoded video frame sequences of the same scene from multiple perspectives; generating a 3D structure of 3D points using the image data; and refining the location of the 3D points in a 3D structure comprising using decoder prediction data to modify the location of the 3D points in a decoder-based bundle adjustment.

By one or more eighteenth implementations, and further to the seventeenth implementation, wherein the refining comprises setting re-projection macroblock locations on a group of current frames of different perspectives captured at substantially a same time.

By one or more nineteenth implementations, and further to the seventeenth implementation, wherein the refining comprises setting re-projection macroblock locations on a group of current frames of different perspectives captured at substantially a same time, and wherein the refining comprises reprojecting the 3D points to the re-projection macroblock locations.

By one or more twentieth implementations, and further to the seventeenth implementation, wherein the refining comprises setting re-projection macroblock locations on a group of current frames of different perspectives captured at substantially a same time, and wherein the refining comprises reprojecting the 3D points to the re-projection macroblock locations, and wherein the refining comprises determining prediction macroblock locations on the current frames by adding motion vectors of the decoder data to re-projection macroblock locations on one or more re-projection reference frames of the current frames.

By one or more twenty-first implementations, and further to the seventeenth implementation, wherein the refining comprises setting re-projection macroblock locations on a group of current frames of different perspectives captured at substantially a same time, and wherein the refining comprises reprojecting the 3D points to the re-projection macroblock locations, and wherein the refining comprises determining prediction macroblock locations on the current frames by adding motion vectors of the decoder data to re-projection macroblock locations on one or more re-projection reference frames of the current frames, and wherein the refining comprises using frames output from the decoder-based bundle adjustment as the re-projection reference frames providing points of the prediction macroblocks.

By one or more twenty-second implementations, and further to the seventeenth implementation, wherein the refining comprises setting re-projection macroblock locations on a group of current frames of different perspectives captured at substantially a same time, and wherein the refining comprises reprojecting the 3D points to the re-projection macroblock locations, and wherein the refining comprises determining prediction macroblock locations on the current frames by adding motion vectors of the decoder data to re-projection macroblock locations on one or more re-projection reference frames of the current frames, and wherein the refining comprises using frames output from the decoder-based bundle adjustment as the re-projection reference frames providing points of the prediction macroblocks, and wherein the refining comprises storing the re-projection reference frames in a reference frame buffer.

By one or more twenty-third implementations, and further any one of the seventeenth to twenty-second implementations, wherein the decoder-based bundle adjustment performs a cost function that determines residuals between 2D points of a prediction macroblock and a version of the 3D points associated with a re-projection macroblock.

By one or more twenty-fourth implementations, and further any one of the seventeenth to twenty-second implementations, wherein the decoder-based bundle adjustment performs a cost function that determines residuals between 2D points of a prediction macroblock and a version of the 3D points associated with a re-projection macroblock, and the method comprising determining residuals of the difference between the 3D points converted to 2D points by camera parameters and the 2D points of the prediction macroblocks for each re-projection macroblock in each view of a substantially same time.

By one or more twenty-fifth implementations, and further any one of the seventeenth to twenty-second implementations, wherein the decoder-based bundle adjustment performs a cost function that determines residuals between 2D points of a prediction macroblock and a version of the 3D points associated with a re-projection macroblock, and the method comprising determining residuals of the difference between the 3D points converted to 2D points by camera parameters and the 2D points of the prediction macroblocks for each re-projection macroblock in each view of a substantially same time, and wherein only inter-prediction macroblocks are used to determine residuals.

In one or more twenty-sixth implementations, a device or system includes a memory and a processor to perform a method according to any one of the above implementations.

In one or more twenty-seventh implementations, at least one machine readable medium includes a plurality of instructions that in response to being executed on a computing device, cause the computing device to perform a method according to any one of the above implementations.

In one or more twenty-eighth implementations, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. At least one non-transitory computer readable medium comprising instructions to cause at least one programmable circuit to at least:
    obtain image data of decoded video frame sequences of a same scene from multiple perspectives;
    generate a three dimensional (3D) structure of 3D points based on the image data; and
    refine locations of the 3D points in the 3D structure based on a decoder-based bundle adjustment, the decoder-based bundle adjustment to refine the locations based on decoder prediction data.

2. The at least one non-transitory computer readable medium of claim 1, wherein the decoder-based bundle adjustment is based on a cost function to generate a residual based on differences between observer points and a version of the 3D points.

3. The at least one non-transitory computer readable medium of claim 1, wherein the instructions are to cause one or more of the at least one programmable circuit to group the 3D points into re-projection macroblocks based on the decoder prediction data to compare a version of the 3D points to points in prediction macroblocks.

4. The at least one non-transitory computer readable medium of claim 3, wherein the instructions are to cause one or more of the at least one programmable circuit to re-project the 3D points into re-projection macroblock locations.

5. The at least one non-transitory computer readable medium of claim 3 wherein the instructions are to cause one or more of the at least one programmable circuit to convert the 3D points of the re-projection macroblocks into two-dimensional (2D) points by using based on a cost function and a camera parameters parameter.

6. The at least one non-transitory computer readable medium of claim 5 wherein the cost function is based on general graph optimization (G2O), and the instructions are to cause one or more of the at least one programmable circuit to generate a G2O edge in the cost function based on the camera parameter.

7. The at least one non-transitory computer readable medium of claim 1, wherein the instructions are to cause one or more of the at least one programmable circuit to determine observer points of prediction macroblocks of the decoder prediction data of first frames to be refined.

8. The at least one non-transitory computer readable medium of claim 7, wherein the instructions are to cause one or more of the at least one programmable circuit to designate second frames output from the decoder-based bundle adjustment as reference frames associated with the first frames.

9. The at least one non-transitory computer readable medium of claim 8, wherein the instructions are to cause one or more of the at least one programmable circuit to cause the reference frames to be stored in a reference frame buffer.

10. The at least one non-transitory computer readable medium of claim 7, wherein the instructions are to cause one or more of the at least one programmable circuit to cause at least one group of pictures to be stored with respective frames of corresponding ones of the video frame sequence of a sequences corresponding to different ones of the perspectives and of a same time.

11. A computer-implemented system comprising:
memory;
instructions; and
at least one programmable circuit to be programmed based on the instructions to:
   obtain image data of decoded video frame sequences of a same scene from multiple perspectives;
   generate a three dimensional (3D) structure of 3D points based on the image data; and
   refine locations of the 3D points in the 3D structure based on a decoder-based bundle adjustment, the decoder-based bundle adjustment to refine the locations based on decoder prediction data.

12. The system of claim 11, wherein the decoder-based bundle adjustment perform is based on a cost function, the cost function to compare two dimensional (2D) points from prediction macroblocks of reference frames with a 2D version of 3D points of re-projection macroblocks of current frames.

13. The system of claim 12, wherein the cost function is based on a residual between the 2D points and the 2D version of the 3D points.

14. The system of claim 11, wherein the decoder prediction data includes decoder motion prediction data, the decoder motion prediction data including that comprises at least one of one or more macroblock locations, motion vectors, identification of one or more reference frames, or identification of a group of pictures frame type.

15. The system of claim 11, wherein one or more of the at least one programmable circuit is to:
   perform a first bundle adjustment not based on the decoder prediction data;
   perform a first 3D reconstruction after the first bundle adjustment;
   perform the decoder-based bundle adjustment; and
   perform a second 3D reconstruction to modify 3D point locations of the 3D structure based on the decoder-based bundle adjustment.

16. A computer-implemented method comprising:
obtaining image data of decoded video frame sequences of a same scene from multiple perspectives;
generating a three dimensional (3D) structure of 3D points based on the image data; and
refining locations of the 3D points in the 3D structure based on a decoder-based bundle adjustment, the decoder-based bundle adjustment to refine the locations based on decoder prediction data.

17. The method of claim 16, wherein the refining includes:
   setting re-projection macroblock locations of a group of current frames of different perspectives captured at substantially a same time; and
   re-projecting the 3D points to the re-projection macroblock locations.

18. The method of claim 17, wherein the refining includes adding motion vectors of the decoder prediction data to the re-projection macroblock locations of one or more re-projection reference frames associated with the current frames to determine prediction macroblock locations of the current frames.

19. The method of claim 18, wherein the refining includes using frames output from the decoder-based bundle adjustment as the one or more re-projection reference frames.

20. The method of claim 19, wherein the decoder-based bundle adjustment is based on a cost function, the cost functions to determine residuals between two-dimensional (2D) points of a prediction macroblock and a version of the 3D points associated with a re-projection macroblock.

* * * * *